April 15, 1958
E. PETER ET AL
2,830,633
POWER NUT CRACKER
Filed May 7, 1956
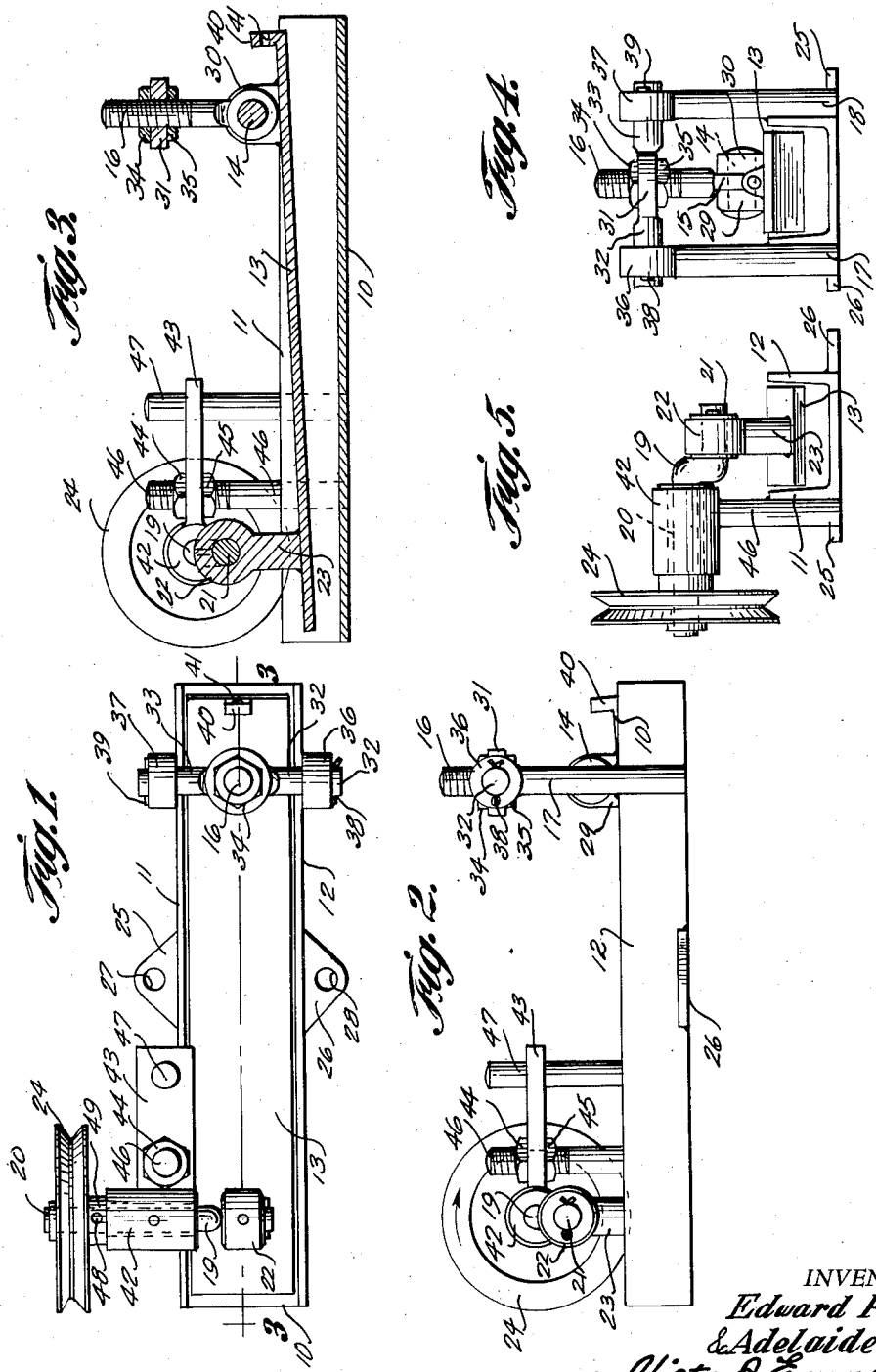
INVENTORS
Edward Peter
& Adelaide Peter
BY Victor J. Evans & Co.
ATTORNEYS

United States Patent Office 2,830,633
Patented Apr. 15, 1958

2,830,633

POWER NUT CRACKER

Edward Peter and Adelaide Peter, Aumsville, Oreg.

Application May 7, 1956, Serial No. 583,032

2 Claims. (Cl. 146—12)

This invention relates to power nut cracking machines where nuts are cracked in quantities for commercial use, and in particular a nut cracking machine having a channel bar providing a bed or base with a vibrating plate pivotally mounted between posts spaced from one end of the channel bar and actuated by an eccentric rotatably mounted in a post spaced from the opposite end of the channel bar whereby with the plate mounted in an inclined position and vibrating or reciprocating at a relatively high speed and with nuts fed into the large end of the machine in which the plate is pivotally mounted, nuts of larger sizes are cracked first, nuts of intermediate sizes cracked at points midway between the ends of the channel bar, and nuts of smaller sizes are cracked in the discharge end of the machine.

The purpose of this invention is to provide a nut cracker for commercial use in which substantially all meat is removed from portions of the shells and in which comparatively large quantities of nuts are cracked in a limited period of time.

With conventional nut crackers for commercial use it is difficult to crack nuts of varying sizes and it is also difficult to remove the meat from the shells. Furthermore, with power actuated nut crackers where the nuts are gripped between jaws the quantity of nuts adapted to be cracked in a certain period of time, is comparatively small. With this thought in mind this invention contemplates a power nut cracker in which the nuts are cracked with a vibrating plate positioned at an angle in relation to the bed or base of the machine whereby nuts of various sizes are cracked in passing through the machine and wherein with the plate vibrating at comparatively high speed substantially all meat of the nuts is separated from the shells.

The object of this invention is, therefore, to provide a power actuated nut cracker in which a cracking jaw is positioned at an angle in relation to the base so that nuts of different sizes may be cracked thereby.

Another object of the invention is to provide a power nut cracker in which meat of the nuts is separated from the shells.

Another important object of the invention is to provide a power actuated nut cracker in which a cranking element of the nut cracker is adjustable in relation to the base or bed of the machine.

A still further object of the invention is to provide a power actuated nut cracker which is of a simple and economical construction.

With these and other objects and advantages in view the invention embodies a bed, channel-shaped in cross section, and a plate pivotally mounted in the bed and adapted to be actuated by an eccentric whereby with the plate mounted in an inclined position in relation to the bed nuts of various sizes will be cracked as they pass through the channel bar.

Other features and advantages of the invention will appear from the following description taken in connection with the drawing, wherein:

Figure 1 is a plan view of the improved power driven nut cracker.

Figure 2 is a side elevational view of the improved nut cracker.

Figure 3 is a longitudinal section through the nut cracker taken on line 3—3 of Fig. 1.

Figure 4 is an end elevational view of the machine looking toward the end in which a cracking element is pivotally mounted.

Figure 5 is an end elevational view looking toward the end of the machine opposite to that illustrated in Fig. 4 and showing, in particular, the eccentric mounting of the cracking element of the cracker.

Referring now to the drawing wherein like reference characters denote corresponding parts the improved nut cracker of this invention includes a channel bar providing a bed or base, having a web 10 with side walls or flanges 11 and 12, a vibrating plate 13 pivotally mounted by a pin 14 in a tongue 15 on the lower end of a threaded stud 16 mounted between posts 17 and 18, and supported at the opposite end with an eccentric including a crank arm 19 extended from the end of a shaft 20 and having a pin 21 on the end of the crank, the pin 21 being positioned in a hub 22 at the upper end of a standard 23 on the plate 13 and the opposite end of the shaft being provided with a pulley 24 by which the shaft and eccentric may be rotated from a small motor, or the like with a belt.

The channel bar is provided with extended flanges 25 and 26 having openings 27 and 28 therein for screws, bolts, or the like for anchoring the base to a table, work bench or the like whereby the channel bar may be mounted in an inclined position to facilitate the passage of nut shells and kernels or meat of the nuts therethrough.

As illustrated in Fig. 4 the pin 14 extends through an opening in the tongue 15 of the stud 16 and also into openings in ears 29 and 30 extended upwardly from the plate 13 and with the stud 16 on the lower end of which the tongue 15 is positioned adjustably mounted in a flat section 31 of trunnions 32 and 33, in which the position of the stud 16 is adapted to be adjusted by nuts 34 and 35, the size or opening of the mouth or receiving end of the cracker is readily adjustable. The trunnions 32 and 33 are pivotally mounted in hubs 36 and 37 at the upper ends of posts 17 and 18 and the trunnions are retained in position by suitable fasteners, such as cotter pins 38 and 39.

The end of the plate 13, at the entrance end of the machine is provided with an agitator lug 40 having an opening 41 therein by which the plate may be agitated or vibrated laterally if desired.

The shaft 20 on which the eccentric or crank arm 19 is provided is rotatably mounted in a bearing 42 at one end of a bar 43 that is adjustably held by nuts 44 and 45 on a threaded stud 46 and the extended end of the bar 43 is positioned over an aligning stud 47. The pulley 24 is secured on the end of the shaft 20 by a pin 48 that extends through a hub 49 on one side of the pulley. By this means the pulley is extended from one side of the machine so that a belt from a similar pulley of a motor or the like may be trained over the pulley for driving the eccentric to vibrate the plate 13.

With the parts designed and assembled as illustrated and described the channel bar which provides the bed or base of the machine is secured to a table top or the like positioned at an angle, such as 20 degrees with the large or entrance end extended upwardly and whereby small broken shells and the like travel freely through the channel bar and are discharged from the small end on which the plate 13 is carried by the eccentric or crank arm.

The parts of the machine are readily adjustable and it will be understood that machines may be provided in different sizes for different kinds of nuts, if desired.

It will also be understood that modifications within the scope of the appended claims, may be made in the design and arrangement of the parts without departing from the spirit of the invention.

What is claimed is:

1. In a power actuated nut cracker, the combination which comprises an elongated channel bar having a web forming a base and having upwardly extended flanges providing side walls positioned on edges of the base, a pair of vertically disposed posts positioned at one end of said channel bar in engagement with the side walls of said base, an elongated plate extended through the channel bar and positioned between the side walls, means positioned in the upper ends of said posts for pivotally mounting one end of the plate at the end of the channel bar adjacent said posts, a shaft having an offset section providing a crank arm rotatably mounted on the channel bar and spaced from the end thereof opposite to the end on which the pivotal mounting of the plate is positioned, means for connecting the offset end of the shaft to the plate, means for adjusting the distance between the shaft and channel bar, and means by which the shaft may be rotated.

2. In a power actuated nut cracker, the combination which comprises an elongated channel bar having a web forming a base and having upwardly extended flanges providing side walls positioned on edges of the base, a pair of vertically disposed posts positioned at one end of said channel bar in engagement with the side walls of said base, an elongated plate extended through the channel bar and positioned between the side walls, means positioned in the upper ends of said posts for pivotally mounting one end of the plate at the end of the channel bar adjacent said posts, means for adjusting the distance between the pivotal mounting and bar, a shaft having an offset section providing a crank arm rotatably mounted on the channel bar and spaced from the end thereof opposite to the end on which the pivotal mounting of the plate is positioned, means for connecting the offset end of the shaft to the plate, means for adjusting the distance between the shaft and channel bar, and means by which the shaft may be rotated.

References Cited in the file of this patent

UNITED STATES PATENTS 2,307,656    Abbott _____ Jan. 5, 1943

FOREIGN PATENTS 22,571    Australia _____ Oct. 21, 1930
of 1929